Figure 1:
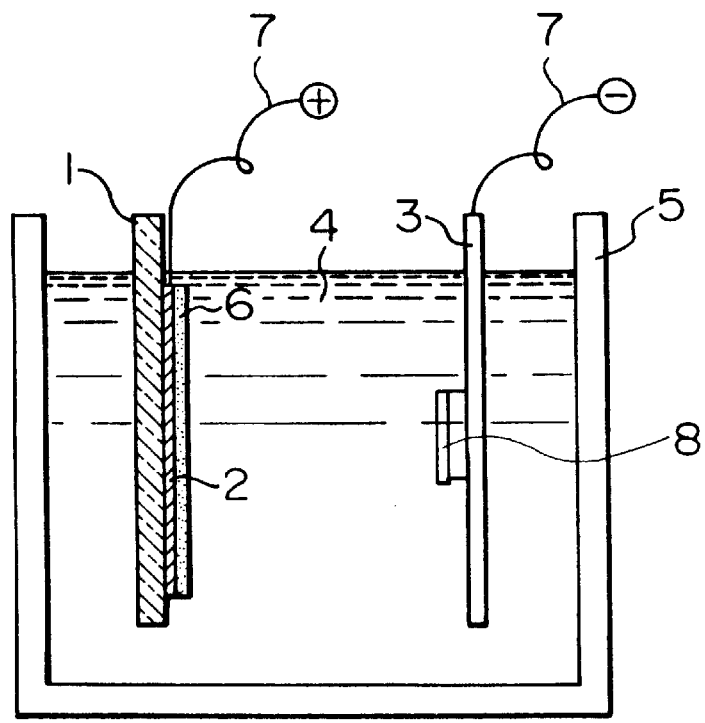

United States Patent
Watanabe et al.

[19]

[11] Patent Number: 5,917,566
[45] Date of Patent: Jun. 29, 1999

[54] ELECTRODEPOSITION METHOD FOR MANUFACTURING COLOR FILTER

[75] Inventors: Tsutomu Watanabe, Itami; Jun-ichi Yasukawa, Chigasaki; Toshiaki Ota, Narashino; Nobuhiko Nishihara, Narashino; Tsuyoshi Tokuda, Narashino, all of Japan

[73] Assignee: Sumitomo Chemical Company, Limited, Osaka, Japan

[21] Appl. No.: 08/580,089

[22] Filed: Dec. 20, 1995

[30] Foreign Application Priority Data

Dec. 26, 1994 [JP] Japan ..................................... 6-322898

[51] Int. Cl.⁶ ...................... G02F 1/1335; G02F 1/1341; G02F 1/1339
[52] U.S. Cl. ............................ 349/106; 349/96; 349/189; 349/190
[58] Field of Search ........................... 430/7, 20; 349/96, 349/106, 189, 190

[56] References Cited

U.S. PATENT DOCUMENTS 4,094,058  6/1978  Yasutake et al. ........................ 349/190
4,277,143  7/1981  Pauli et al. ............................... 349/190

FOREIGN PATENT DOCUMENTS

| 0444631 | 9/1991 | European Pat. Off. . | |
| 2038325 | 2/1972 | Germany . | |
| 60-23805 | 2/1985 | Japan . | |
| 61-100729 | 5/1986 | Japan | ..................................... 349/106 |
| 5-066307 | 3/1993 | Japan | ..................................... 349/106 |

*Primary Examiner*—William L. Sikes
*Assistant Examiner*—Julie Ngo
*Attorney, Agent, or Firm*—Stevens, Davis, Miller & Mosher, L.L.P.

[57] ABSTRACT

A method for manufacturing a color filter which includes arranging an electroconductor and a transparent substrate carrying an electroconductive transparent thin layer in an electrodeposition bath so that the electroconductor and the substrate are disposed in spaced and parallel relationship and that a baffle is disposed between the thus arranged electroconductor and the substrate, and carrying out electrodeposition in the electrodeposition bath by using the electroconductive transparent thin layer as one electrode and the electroconductor as a counter electrode permits the production of a desired color filter having superior layer flatness, even when the substrate enlarged in the size is used.

6 Claims, 1 Drawing Sheet

ELECTRODEPOSITION METHOD FOR MANUFACTURING COLOR FILTER

The present invention relates to an electrodeposition method for manufacturing a color filter.

Color filters suitable for use in the fabrication of color display devices such as color liquid crystal display devices have been manufactured by a dyeing method, a pigment dispersion method, an electrodeposition method, a printing method or others.

Of these methods, the electrodeposition method is particularly preferred from an industrial point of view, because the method is simple in process, high in yield and low in manufacturing cost.

As known, the electrodeposition method is usually carried out by putting in an electrodeposition bath a transparent substrate having an electroconductive transparent thin layer thereon as one electrode and an electroconductor as a counter electrode and applying an electric current thereto at a voltage, thereby forming a color layer on the electroconductive layer.

In recent years, the electroconductive layer-carrying substrate to be used for the manufacture of color filters has been required to be enlarged in the size, because the display picture size of the color display devices has been rapidly enlarged with a rapid improvement of image quality.

In addition, because of the greater market increase of the display devices, the substrate has been required to be enlarged in the size also for obtaining more than one color filter from a sheet of the electroconductive layer-carrying substrate, thereby attaining high productivity.

However, when the color layers are formed by electrodeposition using an electroconductive layer-carrying substrate enlarged in the size to meet the above requirements, fluctuation in the color layer thickness is easy to increase, so that a layer flatness which is an important factor for the display quality of the display devices is deteriorated.

An object of the present invention is to solve the said problem.

Another object of the present invention is to provide an industrially advantageous electrodeposition method capable of manufacturing a color filter of a superior layer flatness even when is used a substrate enlarged in the size for manufacturing display devices of an enlarged picture size or for providing on the surface thereof the electroconductive transparent thin layer so as to obtain more than one color filter from a sheet of the substrate.

These and other objects can be accomplished by providing a method for manufacturing a color filter by electrodeposition, which comprises the steps of:

(a) putting in an electrodeposition bath a transparent substrate having an electroconductive transparent thin layer thereon as one electrode and an electroconductor as a counter electrode, (b) arranging a baffle between the substrate and the electroconductor, and (c) carrying out electrodeposition by applying an electric current at a voltage to the electroconductive layer provided on the substrate and the electroconductor to form a color layer on the electroconductive layer.

Figure 2:
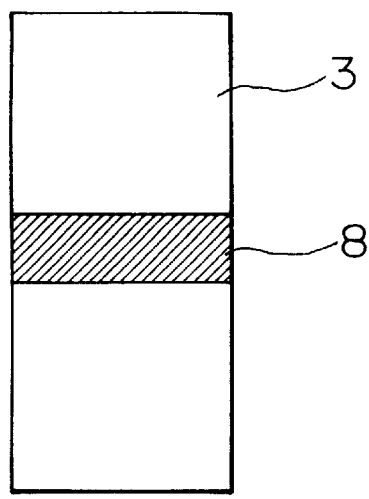

FIG. 1 is a schematic view of an electrodeposition system using a baffle in accordance with the present invention, and FIG. 2 is a schematic side view showing the position relationship between the baffle and the electroconductor (counter electrode).

In FIG. 1 and FIG. 2, the numeral 1 is a transparent substrate having an electroconductive transparent thin layer thereon, 2 is an electroconductive transparent thin layer, 3 is an electroconductor (counter electrode), 4 is an electrodeposition bath, 5 is an electrodeposition vessel, 6 is a color layer, 7 is a lead line and 8 is a baffle.

According to the method of the present invention, a color filter of a superior layer flatness can be manufactured even when a substrate enlarged in the size is used for manufacturing display devices of an enlarged picture size, or for providing thereon the electroconductive transparent thin layer so as to obtain more than one color filter from a sheet of the substrate. For example, the method of the present invention can be effectively carried out even when is used a substrate of a large size provided with an electroconductive thin layer so as to obtain two or four sheets of color filters therefrom.

The baffle in the present invention is not particularly limited as far as the material thereof is insulating and sufficiently durable to the electrodeposition bath. It is preferably a baffle plate. From a viewpoint of availability, processing facility and durability, it is preferred to use a plastic plate such as rigid polyvinyl chloride- and polyacryl-made plates.

The baffle is arranged between the electroconductive layer-carrying substrate and the counter electrode usually in the traverse direction against the course of the electric current in the electroconductive layer. It is preferably disposed in parallel relationship with the electroconductor and the substrate. From a viewpoint of workability, the baffle is usually located in the neighborhood of the counter electrode so as to face to a part of the electroconductive layer-carrying substrate, at which the thickness of color layers is easy to increase. It can be mounted on the counter electrode. For example, as shown in FIG. 1, it can be mounted on the counter electrode at a proper distance in spaced relationship to the surface of the counter electrode. It can be thus mounted by using a supporting means such as a hook made of the afore-said plastics.

Although the form of the baffle is not particularly limited, it is preferred from a viewpoint of workability to use one in a form similar to those of the substrate and the counter electrode, which are usually tetragonal.

The size of the baffle can be determined depending on the size of the electroconductive layer-carrying substrate and the counter electrode, or on the size of a part of the substrate at which the layer thickness is to be controlled. When a baffle plate is used, the surface area thereof is usually not greater than 50% of that of the counter electrode. The thickness thereof is not particularly limited as far as the baffle is durable to the repeating use.

For example, when the electroconductive layer-carrying substrate to be used is 400 mm in length and 350 mm in width, and the layer thickness is found to increase in the middle of the substrate much more than the periphery thereof, a rigid polyvinyl chrolide-made plastic plate of 350 mm in length, 50 to 70 mm in width and 0.5 mm in thickness can be effectively used as the baffle in a manner such that the plastic plate is mounted on the counter electrode at a proper distance so as to adjust the center of the plastic plate to the center of the counter electrode. Although the distance between the baffle and the counter electrode is not particularly limited, it is usually about 40 to 50 mm from viewpoint of handling and workability. FIG. 2 schematically shows the position relationship between the baffle and the counter electrode in this case.

The electroconductive layer-carrying substrate used in the present invention can be prepared in a conventional manner. For example, on the one surface of a transparent substrate including, for example, a glass substrate and plastic substrate, is formed an electroconductive thin layer such as ITO layer (tin-doped indium oxide layer) or NESA layer (antimony-doped indium oxide layer) in a conventional manner, which layer is, if desired, subjected to etching or the like in order to form at least two electroconductive circuits insulated from each other in a desired pattern such as a stripe form.

The electrical resistivity of the electroconductive layer is not particularly limited. In general, the lower, the better. In order to obtain a further improved layer flatness, it is desirable to be 30 Ω/□ or less, preferably 20 Ω/□ or less, more preferably 15 Ω/□ or less.

The resistivity all over the electroconductive layer is made as uniformly as possible to obtain a better result. Also with respect to the substrate evenness, it is desired to be as even as possible. If the resistivity and the substrate evenness satisfy these requirements, the size of the substrate is by no means limited in principle, so that a color filter of any large size can be obtained. This fact is the great advantages brought by the electrodeposition method of the present invention.

A proportion of the area occupied by the electroconductive layer to the surface area of the substrate, which is commonly called an available area of the substrate, is not particularly limited, and usually 60% or more.

The electrodeposition can be carried out in a manner similar to that of a known electrodeposition, provided that the baffle is arranged between the electroconductive layer-carrying substrate and the counter electrode.

The known electrodeposition includes anionic and cationic types. In the present invention, because of less influence against the electroconductive layer, the anionic type electrodeposition is preferably used.

The electrodeposition bath used for the present invention can be prepared in a conventional manner. For example, colorants of a desired color such as dyes and pigments, electrophoretic resins and if desired, conventional additives are dissolved or dispersed in an adequate solvent such as water or organic solvents and then diluted with the said adequate solvent. Examples of the electrophoretic resins are maleinated oil, acryl resins, polyester resins, polybutadiene resins, and polyolefin resins, which may be thermo-setting or photo-curable.

A vessel used for the electrodeposition is not particularly limited as far as the materials thereof are insulating and sufficiently durable to the electrodeposition bath. Examples are rigid plastic vessels such as rigid polyvinyl chloride- and polyacryl-made vessels.

In carrying out the electrodeposition method in accordance with the present invention, the electrodeposition bath is placed in the vessel, and then the electroconductive layer-carrying substrate and the electroconductor such as copper or stainless steel plate are put therein to face each other in parallel at a distance, as one and counter electrodes, respectively, between which the baffle is arranged as described above.

In case of the anionic electrodeposition being carried out, the electroconductive layer-carrying substrate and the counter electrode are used as anode and cathode, respectively, so that a color layer can be formed on the electroconductive layer provided on the substrate.

The electrodeposition can be carried out by applying a direct current at a voltage ranging from about 10 to 300 V for about 1 second to 3 minutes, and the thickness of the color layer can be controlled by selecting the electrodeposition conditions. After completion of the electrodeposition, it is preferred to wash the formed color layer thoroughly in order to remove unnecessary matters. Thereafter, if desired, the color layer can be heat-treated at a temperature of 100 to 280° C. for 10 to 120 minutes in order to enhance the layer strength.

After completion of the formation of the color layers by the electrodeposition in accordance with the present invention, black matrices may be formed between the color layers in a conventional manner. Alternatively, the black matrices may be formed on the transparent substrate before carrying out the electrodeposition also in a conventional manner.

Thus, color filters superior in various characteristics required for the color filter, particularly superior in layer flatness, can be obtained with industrial advantages. The color display devices such as liquid crystal display devices having high display quality can be fabricated in a conventional manner, for example, by a method comprising placing a pair of base plates in spaced and parallel relationship, the one base plate being made by integrally molding the thus manufactured color filter, a polarizing plate and a transparent electrode, and the other base plate being made by integrally molding a polarizing plate and a counter electrode, sealing the peripheries of the base plates using a sealant, and filling the space between the base plates with a liquid crystal.

The method in accordance with the present invention is particularly useful for the manufacture of a color filter using an electroconductive layer-carrying substrate enlarged in the size for manufacturing display devices of an enlarged picture size, or using a substrate provided thereon with an electroconductive transparent thin layer so as to obtain more than one color filter from a sheet of the substrate.

The present invention is illustrated in more detail with reference to the following Example, which is only illustrative, but not limitative.

EXAMPLE

A green electrodeposition bath was prepared in a conventional manner using Phthalocyanine Green SAX (manufactured and sold by Sanyo Color Works in Japan) and Esbia ED 3000 Clear (an anionic polyester-containing paint for electrodeposition, manufactured and sold by Shinto Paint Co. in Japan).

There were prepared a glass substrate of 1.1 mm in thickness, 400 mm in length and 350 mm in width having thereon ITO circuits of 15 Ω/□ in a stripe form of 70 μm in width at a distance of 30 μm (100 μm pitch), and as a counter electrode a stainless steel-made electrode having the same size as that of the glass substrate.

As the baffle in accordance with the present invention, a rigid polyvinyl chloride-made plastic plate of 0.5 mm in thickness, 60 mm in width and 350 mm in length was fixed at the middle of the counter electrode, as shown in FIG. 3.

The electrodeposition bath were put in a vessel, and thereafter the glass substrate and the counter electrode provided with the plastic baffle plate were put thereinto to face each other in parallel at a distance.

Then, electrodeposition was carried out using the ITO circuits on the substrate as anode under conditions of 30° C., 50 V and 10 seconds, whereby green color layers were formed on the circuits. Thereafter, the color layer-carrying substrate taken out was subjected to heat-treatment at 120° C. for 10 minutes.

Using a layer thickness meter (Dektak Type 16000, manufactured by Veeco Inst. Inc.), the layer thickness of the color layers obtained was measured at different 14 points, and the layer flatness of the color layers was judged by a layer uniformity percent calculated by the following equation.

A layer uniformity percent (%)={(maximum layer thickness−minimum layer thickness)/(average layer thickness of 14 points)}×100

The layer uniformity percent was found to be less than 15%, which value is recognized in this art for the layer flatness to be "superior" from a practical point of view.

Comparative Example

The above Example was repeated, provided that no baffle was used. After completion of the electrodeposition, an increased layer thickness was visually observed at the middle of the color layers formed on the substrate, and the layer uniformity percent calculated was found to be much greater than 15%.

What is claimed is:

1. A method for manufacturing a color filter by electrodeposition, which comprises the steps of:
   (a) putting in an electrodeposition bath a transparent substrate having an electroconductive transparent thin layer thereon as one electrode and an electroconductor as a counter electrode,
   (b) arranging a baffle between the substrate and the electroconductor, and
   (c) carrying out electrodeposition by applying an electric current at a voltage to the electroconductive layer provided on the substrate and the electroconductor to form a color layer on the electroconductive layer,
   the baffle being a tetragonal plate which is mounted on the electroconductor in spaced and parallel relationship with the electroconductor and has a surface area of not greater than 50% of that of the electroconductor.

2. A method according to claim 1, wherein the plate ismade of a plastic.

3. A method according to claim 1, wherein the electroconductive layer provided on the substrate is formed into at least two circuits insulated from each other.

4. A method according to claim 1, wherein the electrodeposition is carried out by using the electroconductive layer as anode and the electroconductor as cathode.

5. A method according to claim 4, wherein the electrodeposition is carried out by applying a direct current at a voltage ranging from about 10 to 300 V for about 1 second to 3 minutes.

6. A method for fabricating a liquid crystal display device by
   (a) placing a pair of base plates in spaced and parallel relationship, the one base plate carrying a color filter, a polarizing plate and a transparent electrode, and the other base plate carrying a polarizing plate and a counter electrode,
   (b) sealing the peripheries of the base plates using a sealant, and
   (c) filling the space between the base plates with a liquid crystal,
   the method being characterized by using the color filter manufactured by the method of claim 1 for making the one base plate.

* * * * *